United States Patent
Harlow

(10) Patent No.: US 7,070,133 B1
(45) Date of Patent: Jul. 4, 2006

(54) SILO BIN DRILL SYSTEM AND METHOD OF CLEANING CLOGGED BULK GRAIN MATERIAL

(76) Inventor: Dale Harlow, 7481 Marshall St., Arvada, CO (US) 80003

(*) Notice: Subject to any disclaimer, the term of this patent is extended or adjusted under 35 U.S.C. 154(b) by 188 days.

(21) Appl. No.: 10/767,353

(22) Filed: Jan. 28, 2004

(51) Int. Cl.
*B02B 1/00* (2006.01)
*B02C 1/08* (2006.01)

(52) U.S. Cl. .................................. 241/30; 241/274
(58) Field of Classification Search ................ 241/30, 241/274, 277, 282.1, 282.2
See application file for complete search history.

(56) References Cited

U.S. PATENT DOCUMENTS

| | | | | |
|---|---|---|---|---|
| 3,220,494 A | * | 11/1965 | Cannon et al. ............... | 175/27 |
| 3,968,998 A | * | 7/1976 | Wolf ........................... | 406/58 |
| 4,198,186 A | * | 4/1980 | Holdren et al. ............. | 414/308 |
| 5,074,478 A | * | 12/1991 | Fujiwara et al. ............. | 241/60 |
| 5,975,447 A | * | 11/1999 | Brusseau .................... | 241/95 |

* cited by examiner

*Primary Examiner*—Faye Francis
(74) *Attorney, Agent, or Firm*—Edwin H. Crabtree; Ramon L. Pizarro

(57) ABSTRACT

A silo bin drilling system used for unclogging bulk material in a silo bin. The drilling system includes a hydraulic drill with drill motor. The drill is mounted above an access hole in a top portion of the bin. An access door in a bottom of the bin is used for forming a lower bin cavity in the material. The system also includes a pipe string. The pipe string is attached to a pipe string motor. A bottom of the pipe string is attached to a drill bit with foldable blades. The drill bit is used for drilling a cavity access hole through the clogged bulk material into the lower bin cavity. The pipe string motor then moves the drill bit with unfolded blades upwardly through the material drilling a large diameter raise hole until the clogged material collapses in the bin.

13 Claims, 4 Drawing Sheets

SILO BIN DRILL SYSTEM AND METHOD OF CLEANING CLOGGED BULK GRAIN MATERIAL

BACKGROUND OF THE INVENTION (a) Field of the Invention

This invention relates to removing compressed and/or compacted soft bulk materials stored in a silo bin and the like and more particularly, but not by way of limitation, to a silo bin drill system and method of unclogging compressed and/or compacted bulk grain and feed material that is hung up in the silo bin.

(b) Discussion of Prior Art

In the agriculture business, the clogging of bulk grain and feed material in large silo bins is a common problem. The unclogging of the material is time consuming, labor intensive, and expensive. Also, when a workman tries to work on top of the clogged material in the bin or through an access opening in the bottom of the bin there is a real danger to the individual. Also, over a period of time, moisture in the material migrates downwardly in the clogged material further compressing and solidifying the material making it more difficult to be unclogged. Further, the weight of the upper material in the bin compressing together the lower material adds to the problem of clogging. Also, natural dew point causes bin walls to sweat thereby increasing humidity and weight in clogged material.

Currently in the United States and Canada, engineering service companies are on call for drilling a series of vertical bore holes downwardly in the clogged material. With sufficient holes and using a spinning whip, hopefully the hung up material will break loose and gravity feed out the bottom of the bin. This type of grain drilling service takes two to three days or more and at a large expense to the silo bin owner.

In U.S. Pat. No. 5,074,478 to Fujiwara et al., a system for crushing and discharging caked granular material in a storage tank is disclosed. A vertical guide hole is drilled downwardly through the caked material using compressed air. A crusher with crushing blades is then used for crushing the caked material around the periphery of the guide hole and discharging the material down the guide hole.

In U.S. Pat. No. 4,198,186 to Holdren et al., a portable tool is described for digging out clogged silage in a silo. The dig out tool is used horizontally and received through an access opening in a lower portion of an outer wall of silo.

In U.S. Pat. No. 5,975,447 to Brusseau, a caked grain breaker is illustrated. The grain breaker is hydraulically operated and includes a top grate positioned above an opening in the bottom of the bin floor. A plurality of spikes are mounted above the grate. The spikes are used for breaking apart the caked grain as it is received on the grate.

In U.S. Pat. No. 3,220,494 to Cannon et al., an underground hard rock raise drilling method is disclosed. In a mining operation, a small pilot hole is drilled downwardly from an upper level to a lower level, typically one hundred yards or more. A raise cutter head, having a diameter in a range of 40 inches, is then attached to a drill pipe received through the pilot hole. The raise cutter head is then hydraulically raised cutting a large diameter bore hole or "raise shaft" through the rock. The raise shaft is used for ventilation, a rescue shaft, drainage and the like. Obviously, this type of a hard rock boring system is far removed from cleaning out soft clogged bulk material stored in a silo bin.

The subject silo bin drill system and method of cleaning clogged bulk material provides unique features, objects and advantages over the prior art drills and method of unclogging bulk storage material described in the above mentioned prior art patents.

SUMMARY OF THE INVENTION

In view of the foregoing, it is a primary objective of the subject invention to provide a silo bin drill system that can drill a large diameter raise hole, in a range of 6 to 36 inches and greater, upwardly from a cavity in a bottom of a silo bin and through the clogged bulk material. The large diameter raise hole is drilled through the clogged bulk material until it begins to cave in on itself and thereby unclog the bin. The silo bin drill system can be used in the storage of various agriculture products and in other industries storing soft bulk items that tend to clog when received in large storage facilities.

Another object of the drill system is that it is designed to cut quickly through soft bulk material as it moves upwardly through the clogged material. The drilling time can vary in a range to 3 to 5 hours depending on the depth of the clogged material. The depth of the clogged material can vary from 10 up to 120 feet depending on the height of the bin.

Yet another object of the drill system is the use of a unique drill bit with a pair of foldable drill blades affixed to the side of the drill bit. The drill bit is used initially for drilling downwardly a small cavity access hole, in a range of 2 to 4 inches. When the drill bit drops into a lower bin cavity in the bottom of the bin, centrifugal force of the spinning drill bit causes the drill blades to fold outwardly. The drilling then proceeds upwardly with the drill bit and unfolded drill blades cutting the large diameter raise hole.

Still another object of the silo bin drill system is the elimination of using manual labor to dig into clogged bulk material or using drill holes with a whip thereby eliminating danger to workmen and greatly reducing the cost of unclogging the material in the bin.

The silo bin drill system includes a portable hydraulic drill with drill motor, a hydraulic tank, hydraulic lines and pressure and direction controls. The hydraulic drill with drill motor is mounted above an upper bin access hole in a top portion of a silo bin. The silo bin is considered operational when it is not clogged and material flows freely therein. It is not operational when it is used for holding clogged grain, feed and other soft bulk material therein. Also, the silo bin includes a cone shaped metal hopper with hopper access door in the bottom of the bin. Using the access door, a lower bin cavity is manually formed in the bottom of the bin by digging out the clogged material therein. The drill system also includes a plurality of threaded drill pipe sections connected together by threading and forming a drill pipe string. The top of the drill pipe string is attached to the hydraulic drill pipe string motor. A bottom of the drill string is attached to a drill bit with foldable blades disposed next to the sides of the drill bit. The drill bit, with foldable blades folded inward is used for drilling a cavity access hole downwardly through the compressed clogged bulk material and into the lower bin cavity. The hydraulic drill pipe string motor then moves the drill bit with centrifugally unfolded blades upwardly through the clogged bulk material drilling a large diameter raise hole until the clogged material collapses around the sides of the raise bore.

These and other objects of the present invention will become apparent to those familiar with various types of drilling systems used for unclogging soft bulk materials in storage silo bins and other large bulk storage facilities when reviewing the following detailed description, showing novel construction, combination, and elements as herein described, and more particularly defined by the claims, it being understood that changes in the various embodiments of invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application thereof, and in which.

DETAILED DESCRIPTION OF THE PREFERRED EMBODIMENTS

Figure 1:
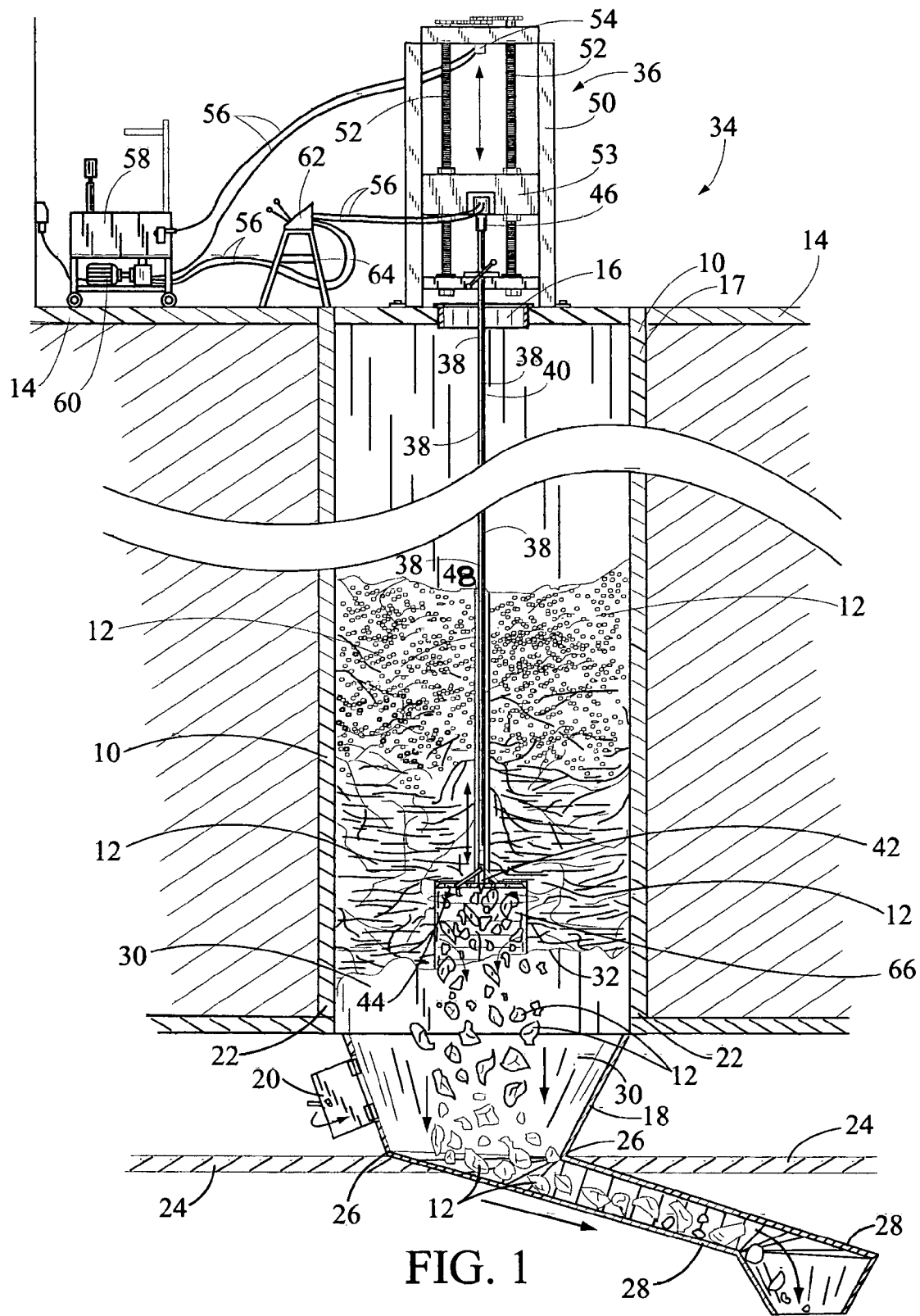
FIG. 1 is a side sectional view of a silo bin with clogged bulk material stored therein. The subject silo bin drill system is shown drilling a large diameter raise hole upwardly through the compressed clogged bulk material.

In FIG. 1, is a side sectional view of a silo bin 10 is shown with clogged bulk material 12 stored therein. The silo bin 10 includes an upper floor 14 with an upper access hole 16 for discharging the bulk material 12 into a top 17 of the silo bin 10. Also, the silo bin 10 includes a cone-shaped metal hopper 18 with access door 20 for providing access into a bottom 22 of the bin 10. A lower floor 24 is shown next to a bottom 26 of the hopper 18. The bottom 26 of the hopper is attached to a discharge chute 28 for feeding the bulk material by gravity from the bin 10.

When a "hang-up"occurs in the bin 10 and the bulk material 12 becomes clogged as shown, the access door 20 is used for manually digging out a lower bin cavity 30 in and around the inside of the hopper 18. The lower bin cavity 30 provides access to a bottom 32 of the clogged bulk material 12. In operation, workmen will often beat the outside of the metal hopper 18 with hammers to hopefully keep the bulk material 12 feeding into the discharge chute 28. Obviously, this doesn't always work and hang-ups occur, which the subject invention addresses.

In this drawing, the clogged bulk material 12 is shown with a lower portion of the material more tightly compressed and clogged due to downward moisture migration and with the weight of less dense bulk material on top of the compressed material. Obviously, if the lower tightly compressed material can be unclogged, the looser material above will in turn collapse.

The subject silo bin drill system is shown having general reference numeral 34. The drill system 34 broadly includes a hydraulic drill, having general reference numeral 36, a plurality of threaded drill pipe 38 connected together and forming a drill pipe string 40 and a drill bit 42 with outwardly extending fixed cutting blades 44. The threaded drill pipe 38 typically comes in afoot sections to ensure each section can withstand the applied torque and retain tinsel strength to remain straight and rigid so as to avoid wobble during the drilling process.

A top of the drill pipe string 40 is attached to a hydraulic drill pipe string motor 46, which is part of the hydraulic drill 36. A bottom of the drill pipe string 40 is attached to the drill bit 42. The drill bit 42 is used for drilling a cavity access hole 48 downwardly through the compressed clogged bulk material 12 and into the lower bin cavity 30. The cavity access hole 48 is typically in a range of 4 to 6 inches in diameter. In this drawing cavity access hole is shown already drilled through the bulk material 12.

The hydraulic drill 36, for rotating the pipe string 40 and the drill bit 42 with cutting blades 44, includes a drill stand 50, a pair of all-thread drive screws 52 mounted on a drive head 53, a hydraulic drive screw motor 54, the hydraulic drill pipe string motor 46, a plurality of hydraulic lines 56 connected to a hydraulic tank 58 with hydraulic pump motor 60 and hydraulic controls 62 mounted on a stand 64. The hydraulic controls 62 are connected to the hydraulic lines 56 for controlling the direction of the pipe string motor 46, mounted on the drive head 53, for turning the pipe string 40. Also, the hydraulic controls 62 are connected to the drive screw motor 54 for turning the all-thread drive screws 52 used for raising and lowering the pipe string 40 inside the silo bin 10.

As mentioned above, the cavity access hole 48 has been completed, as shown in this drawing, and the pipe string 40 is raised by the drive screw motor 54 and rotated by the pipe string motor 46. When this happens, the unfolded cutting blades 44 rotate into the bottom 32 of the bulk material 12 cutting a large diameter raise hole 66. As mentioned above, the raise hole 66 may vary in size in a range of 6 to 36 inches and greater depending on the type of bulk material being drilled. As the raise hole 66 is drilled upwardly, the cut bulk material 12 falls between the cutting blades 44 into the lower bin cavity 30 and into the discharge chute 28.

Figure 2:
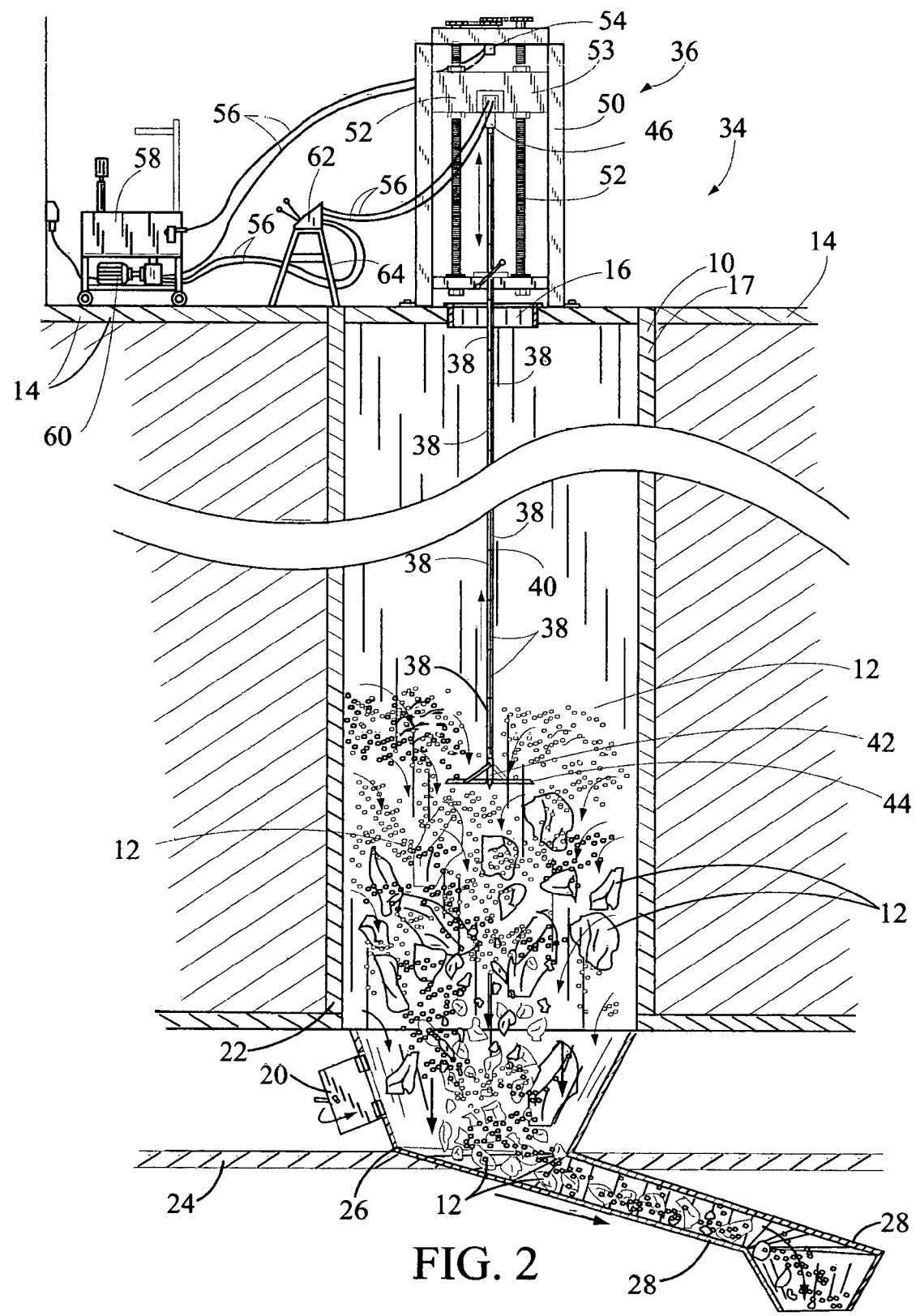
FIG. 2 is another sectional view of the silo bin with the drilling of the large diameter raise hole continuing upwardly until the bulk material collapses around the sides of the raise hole thereby causing an avalanche of the bulk material downwardly into the bottom of the bin.

In FIG. 2, another sectional view of the silo bin 10 is shown with the drilling of the large diameter raise hole 66 continuing upwardly until the bulk material 12. In the operation of the silo bin drilling system 34, as the cutting blades 44 continue upwardly as shown and drilling through the more compacted lower portion of the bulk material 12 into the less dense upper portion of the bulk material, the bulk material begins to collapse around the sides of the raise hole 66. As the material collapses, an avalanche of the bulk material 12 moves downwardly into metal hopper 18 and out the discharge chute 28 thus completing the unclogging of the silo bin 10.

Figure 3:
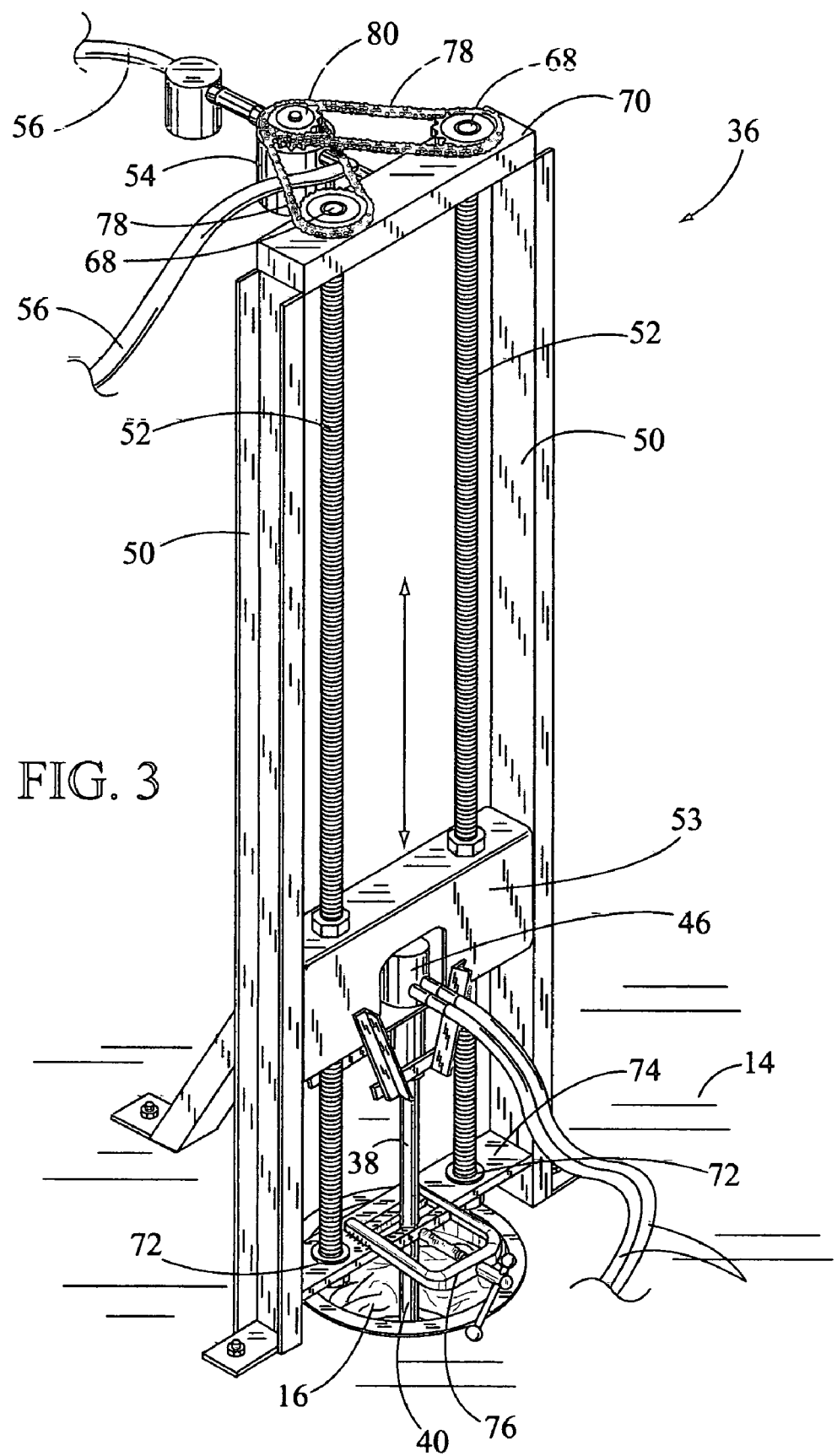
FIG. 3 is a perspective view of the hydraulic drill with drill stand, a pair of all-thread drive screws, a hydraulic drive screw motor, a hydraulic drill pipe string motor and a drill pipe clamp. The drill pipe clamp is used holding an upper drill pipe when adding or removing a threaded drill pipe to or from the drill pipe string.

In FIG. 3, a perspective view of the hydraulic drill 36 is shown in greater detail. As mentioned above, the drill 36 includes the portable drill stand 50, which is secured to the upper floor 14 and center above the upper access hole 16 and above the top 17 of the silo bin 10. A top of the all thread drive screws 52 is attached to chain sprockets 68 mounted on an upper cross bar 70. A bottom of the all thread drive screws 52 is attached to bearings 72 mounted on a lower cross bar 74. The all tread drive screws 52 are used threaded inside the drive head 53 for raising and lower the drive head 53, the pipe string motor 46 and the top of the attached drill pipe string 40. In this drawing, a drill pipe clamp 76 is shown attached to the top of a drill pipe 38. The drill pipe clamp 76 is used for securing the drill pipe string 40 when removing or adding a drill pipe 38 to the pipe string. The chain sprockets 68 are attached to a pair of chains 78. The chains 78 are attached to a drive chain sprocket 80 mounted on the drive screw motor 54.

Figure 4:
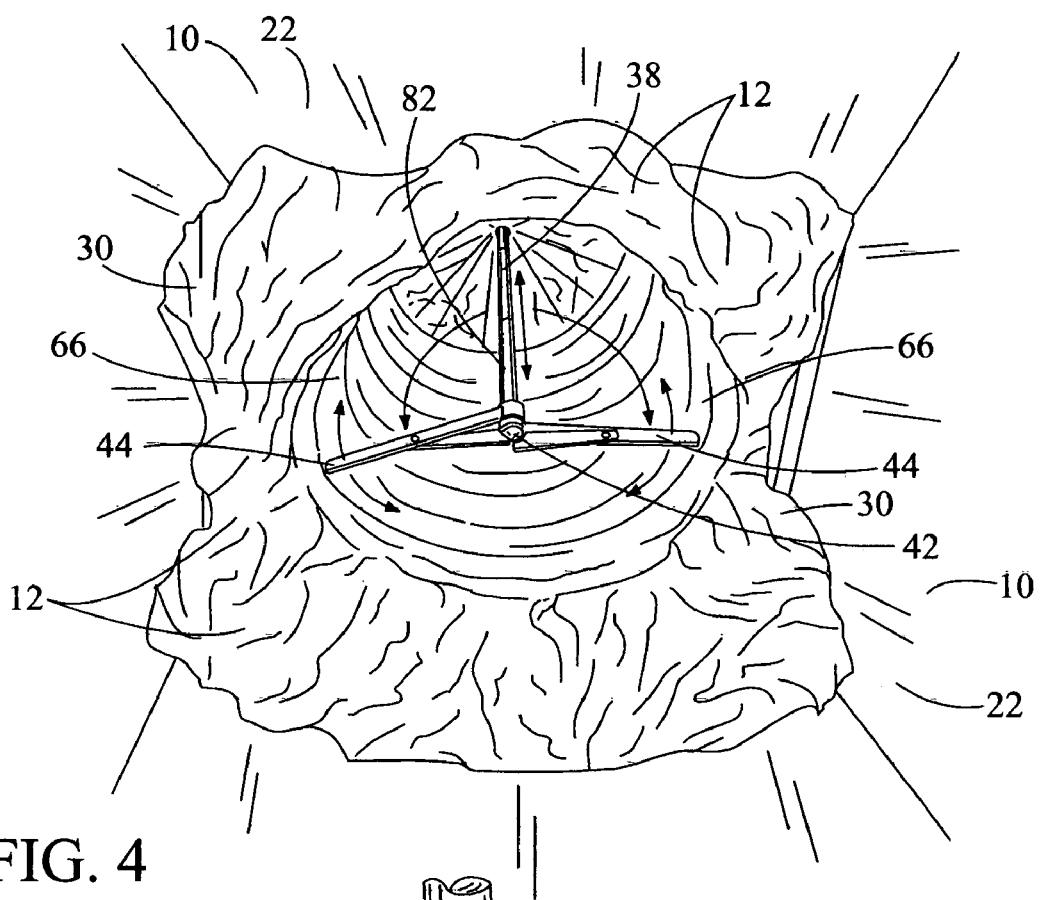
FIG. 4 is a perspective view looking upwardly inside the lower bin cavity. This drawing illustrates one embodiment of a drill bit with fixed cutting blades shown cutting the large diameter raise hole in the bottom of the clogged bulk material.

In FIG. 4, a perspective view of the lower bin cavity 30 is shown and illustrating one embodiment of the drill bit 42 with fixed cutting blades 44 shown cutting the large diameter raise hole 66 in the bottom 22 of the clogged bulk material 12. The drill bit 42 includes a drill stem 82, which is attached to threads on the lower drill pipe 38. When the cavity access hole 48 is drilled using a separate drill bit, the drill pipe string 40 is lower next to the access door 20 and the bit is removed. The separate drill bit is not shown in the drawings. The drill bit 42 with fixed cutting blades 44 is then attached using the drill stem 82 threaded on the bottom of the lower drill pipe 38. The drill pipe string 40 is then raised and the fixed cutting blades 44 are rotated into the soft bulk material 12 creating the large diameter raise hole 66 as shown.

Figure 5:
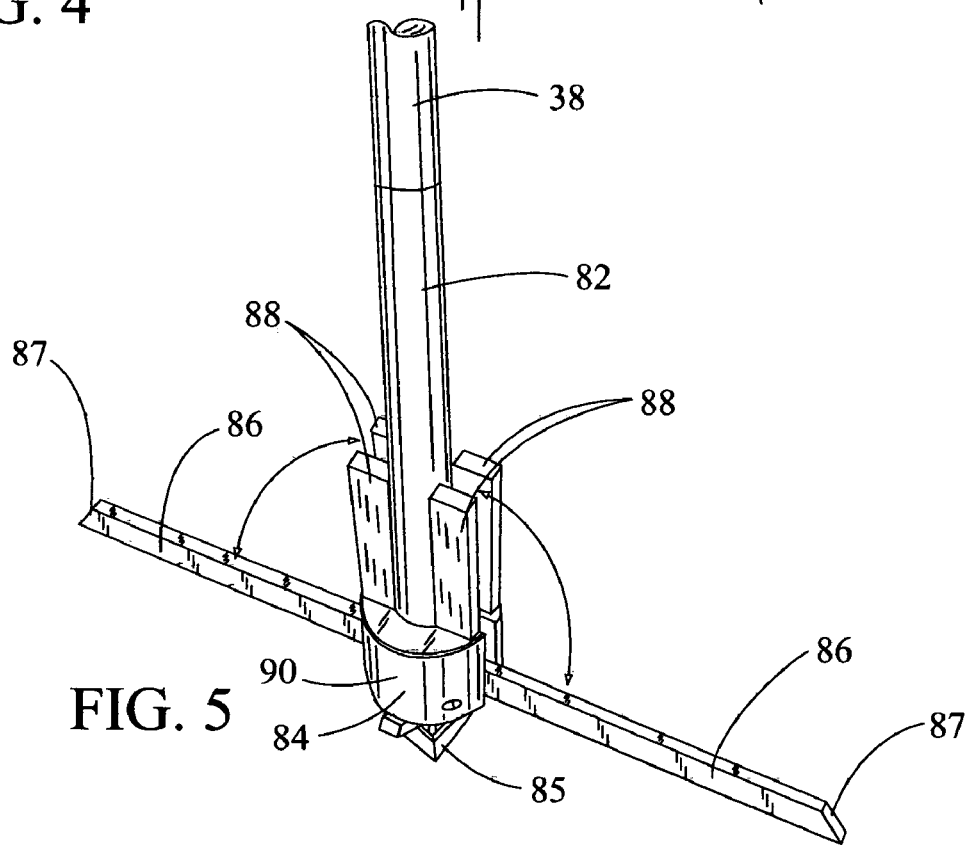
FIG. 5 is a perspective view of another embodiment of the drill bit with foldable cutting blades. The blades are shown in an unfolded position for cutting the large diameter raise hole.

In FIG. 5, a perspective view of another embodiment of a drill bit 84 with a pointed end 85 is shown with foldable cutting blades 86 and beveled ends 87. This type of drill bit 84 with pointed end 85 eliminates the need of having to removed a separate drill bit and adding the drill bit 42 with fixed cutting blades 44 inside the lower bin cavity 30 prior to forming the raise hole 66. In operation, the cavity access hole 48 is drilled downwardly with the foldable cutting blades 86 folded inside two pair of vertical ribs 88 disposed next to a body 90 of the drill bit 84. When the cavity access hole 48 is completed and the drill bit 84 drops into the lower bin cavity 30, the foldable cutting blades 86 automatically drops downwardly into a horizontal position as shown. In this position, the drill bit 84 is ready to be raised with the foldable cutting blades positioned for drilling the large diameter raise hole 66.

It should be noted that the drill bit 42 with fixed cutting blades 44 and the drill bit 84 with foldable cutting blades 86 are ideal for soft bulk material such as grain, feed, coal, potash, fly ash and other materials having a Mohs hardness of less than 3. Also, the soft bulk material has typically been milled or processed in some manner prior to being stored in a large bulk facility. Further, the cutting blades 44 and 86 allow sufficient room between the blades and the drill bit for allowing the cut bulk material to easily fall downwardly as the raise hole 66 advances upwardly. Obviously, using an auger for cutting the bulk material traps the cut material around the auger blade as it spirals upwardly and therefore does not provide the advantages of the subject drill bit with cutting blades as disclosed herein. Also, as the large diameter raise hole 66 is cut, air circulation inside the silo bin 10 increases thus aiding gravity in helping collapse the clogged bulk material 12.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

The embodiments of the invention for which as exclusive privilege and property right are claimed are defined as follows:

1. A method of unclogging clogged bulk material stored in a silo bin, the steps comprising:
   drilling downwardly a small diameter cavity access hole from a top of the silo bin through the clogged bulk material and into a lower bin cavity, the lower bin cavity disposed below the clogged bulk material; and
   drilling upwardly a large diameter raise hole in the clogged bulk material, the large diameter raise hole sufficient in size to allow the clogged bulk material to cave in and around the sides of the large diameter raise hole as the raise hole advances upwardly through the bulk material.

2. The method as described in claim 1 further including a step of digging out the lower bin cavity disposed below the clogged bulk material prior to drilling the small diameter cavity access hole.

3. The method as described in claim 1 wherein the large diameter raise hole is in a range of from 6 to 36 inches in diameter.

4. The method as described in claim 1 wherein the small diameter cavity access hole is in a range of from 2 to 4 inches in diameter.

5. The method as described in claim 1 wherein the depth of the clogged material is in a range of 10 to 120 feet depending on the height of the silo bin.

6. The method as described in claim 1 wherein the drilling of the small diameter cavity access hole includes using a drill bit with at least one foldable drill blade disposed next to the side of the drill bit and the drilling the large diameter raise hole includes using the drill bit with the drill blade unfolded and extending outwardly therefrom.

7. The method as described in claim 1 wherein the drilling of the large diameter raise hole includes using a drill bit with at least one outwardly extending drill blade for cutting into the soft bulk material.

8. A method of unclogging clogged bulk material stored in a silo bin, the steps comprising:
   opening an access door in a bottom of the silo bin and digging out a lower bin cavity disposed below the clogged bulk material;
   using a hydraulic drill and drilling downwardly a small diameter cavity access hole from a top of the silo bin through the clogged bulk material and into the lower bin cavity; and
   using the hydraulic drill and drilling upwardly a large diameter raise hole in the clogged bulk material, the large diameter raise hole sufficient in size to allow the clogged bulk material to cave in and around the sides of the large diameter raise hole as the raise hole advances upwardly through the bulk material.

9. The method as described in claim 8 wherein the large diameter raise hole is in a range of from 6 to 36 inches in diameter.

10. The method as described in claim 8 wherein the small diameter cavity access hole is in a range of from 2 to 4 inches in diameter.

11. The method as described in claim 8 wherein the depth of the clogged material is in a range of from 10 to 120 feet depending on the height of the silo bin.

12. The method as described in claim 8 wherein the drilling of the small diameter cavity access hole includes using a pointed drill bit with a pair of foldable drill blades disposed next to the side of the drill bit and the drilling of the large diameter raise hole includes using the pointed drill bit with the drill blades unfolded and extending outwardly therefrom.

13. The method as described in claim 8 wherein the drilling of the large diameter raise hole includes using a drill bit with a pair of outwardly extending drill blades for cutting into the bulk material.

\* \* \* \* \*